Dec. 8, 1942.  E. B. LEAR  2,304,646
BRAKE CONTROL FOR SLUSHER HOISTS
Filed Aug. 1, 1941
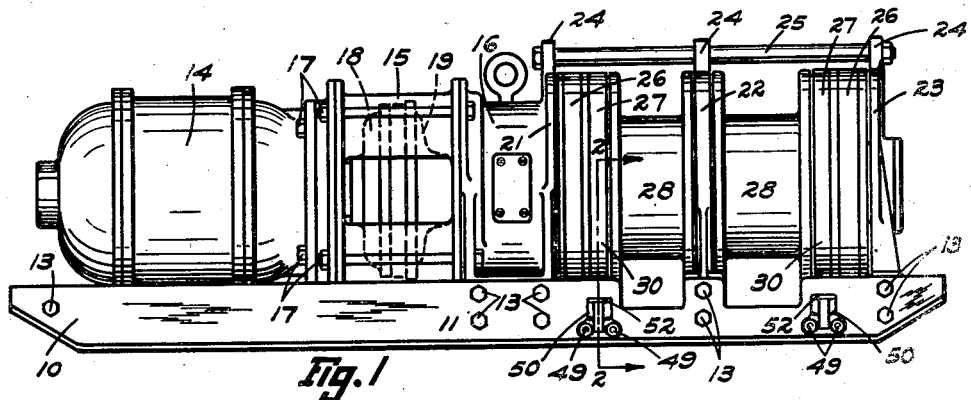
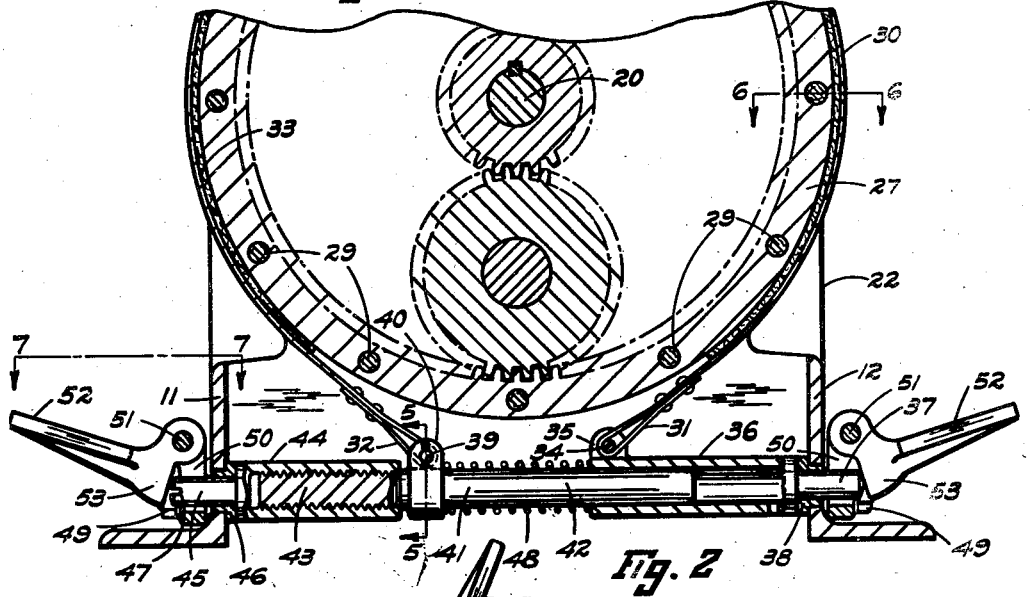
INVENTOR
EARL B. LEAR
BY
ATTORNEY Patented Dec. 8, 1942

2,304,646

UNITED STATES PATENT OFFICE 2,304,646

BRAKE CONTROL FOR SLUSHER HOISTS

Earl B. Lear, Garfield Heights, Ohio, assignor to The Cleveland Rock Drill Company, Cleveland, Ohio, a corporation of Ohio Application August 1, 1941, Serial No. 405,103

5 Claims. (Cl. 188—105)

This invention relates broadly to slusher hoists, but more particularly to an improved brake mechanism for the drum of such hoist.

One object of this invention is to equip a slusher hoist with an improved brake, simple in construction and effective in operation.

Another object of this invention is to produce a hoist having a foot brake operable from either side of the hoist.

Another object of this invention is to produce a hoist having a winding drum equipped with an improved brake equally effective for checking the speed of the drum irrespective of the direction of its rotation.

A further object of this invention is to provide the winding drum of a hoist with a brake constructed and disposed in a manner affording simple and efficient adjustment of the brake band.

Other objects and advantages more or less ancillary to the foregoing reside in the specific construction and aggroupment of the elements peculiar to this structure, as will become apparent from a more complete examination of this specification.

In the drawing:

Fig. 1 is a side longitudinal view of a hoist embodying the invention.

Fig. 2 is an enlarged cross sectional view taken in a plane indicated by line 2—2 in Fig. 1.

Figs. 3 and 4 are fragmentary views of Fig. 2 showing parts in different positions.

Fig. 5 is a cross sectional view taken from a plane indicated by line 5—5 in Fig. 2.

Fig. 6 is a longitudinal sectional view taken in a plane indicated by line 6—6 in Fig. 2.

Fig. 7 is a plane view looking in the direction of arrows 7—7 in Fig. 2.

Referring to the drawing in which like numbers designate corresponding parts throughout the several views, 10 represents a base frame including two parallel side members 11 and 12 preferably made of L-shaped angle iron and secured together by any suitable means such as cross bolts 13. Longitudinally mounted on the frame 10 there is a hoist assembly shown to include a motor 14, an hydraulic coupling housing 15 and a gear reduction casing 16 all secured together by bolts 17. Obviously, the driving member 18 of the hydraulic coupling within the housing 15 is operatively connected to the motor 12, while the driven member 19 of the hydraulic coupling is mounted on a shaft, not shown, extending into the gear reduction casing 16. Projecting longitudinally away from the casing 16 there is a shaft 20 adequately journaled within longitudinally spaced bearing supports 21, 22 and 23, the bearing support 21 being an integral part of the casing 16, while the last one forms the end of the hoist assembly shown in Fig. 1. Each of these supports is rigidly secured to the base frame 10 by the cross bolts 13, while the upper end of each support is provided with a lug 24 through which extends a tie rod 25.

Rotatably mounted on the shaft 20 adjacent each bearing support 21 and 23, there is a relatively narrow drum 26 operatively associated with a similar drum 27 which in turn is interconnected with the shaft 20 by any suitable gearing in a manner drivingly rotating the drum 27 when the drum 26 is held against rotation and allowing the drum 27 to either remain stationary or rotate freely when the drum 26 is free to rotate. In practice, each drum 26 is operatively associated with any suitable hand operated brake through which the drum may be held stationary or allowed to rotate. Since the interconnecting mechanisms between the several shafts and drums above referred to form no part of this invention, no further explanation is thought necessary other than pointing out that each drum 27 is drivingly connected with a rope winding drum 28 by any suitable means such as cap screws 29, the drum 28 being rotatably mounted on the shaft 20. It will now be understood that when the drum 26 is held against rotation both drums 27 and 28 are drivingly rotated in one or the other direction and that when the drum 26 is allowed to rotate the drums 27 and 28 either remain stationary or are free to rotate when, for instance, subjected to the pull of the rope wound around the drum 28.

In order to check at will the rotation of each winding drum 28, its component drum 27, hereinafter referred to as brake drum, is provided with a brake assembly including a brake band 30 partly surrounding the drum 27 and having looped terminals 31 and 32 located under the drum 27, between the side members 11 and 12 of the base frame 10. The inner side of the brake band 30 is effectively lined with any suitable brake lining 33 engageable with the peripheral wall of the drum 27. The looped end 31 of the brake band 30 is pivotally connected by a cross pin 34 to a forked lug 35 formed on one end of a sleeve 36 which has its other end reduced in diameter to form a solid stem 37 which extends through the base frame side member 12 and is slidably guided within a bushing 38 rigidly carried by the side member 12. The other looped terminal 32 of the brake band 30 is similarly connected by a cross pin 39 to a forked lug 40 provided on a rod 41 intermediate the ends thereof, which rod has a smooth cylindrical portion 42 slidably guided within the sleeve 36 and a screw threaded portion 43 mounted within a sleeve nut 44 which is also provided with a reduced solid cylindrical shank 45 extending through the frame side member 11 and guided within a stationary bushing 46, the free end of the shank 45 being provided with a screw driver slot 47. Interposed between the forked lugs 35 and 40 and mounted on the rod 41, there is a compression spring 48 tending to maintain the looped terminals 31 and 32 of the brake band 30 away from each other.

Secured to the exterior side of each frame side member 11 and 12 by bolts 49, there is a bracket 50 carrying a cross pin 51 on which is pivotally mounted a foot pedal 52 having a lug 53 active one on the free end of the sleeve 36 and the other on the shank 45 of the nut 44.

In the operation, when it is desired to check the rotary speed of the drum 28 regardless of its direction of rotation, either one or both foot pedals 52 may be depressed. In this instance, pivotal movement of the pedal around the cross pin 51 will cause the lug 53 to exert inward pressure on either the shafted end 37 of the sleeve 36 or shank 45 of the nut 44, causing one or the other of the looped terminals 31 and 32 of the brake band 30 to move inwardly against the compression spring 48, thereby causing a squeezing action of the brake band 30 against the drum 27 for checking its rotation. Since one of the looped terminals 31 and 32 is held stationary during the inward movement of the other, it will be understood that braking action of the drum 27 will be equally effective irrespective of the direction of rotation of the drum. When the pressure applied on either of the foot pedals 52 is released, the compression spring 48 active on the sleeve 36 and lug 40 of the rod 41 will again cause movement of the brake band terminals 31 and 32 away from each other and automatically bring the foot pedals 52 back to their original position as shown in Fig. 2.

When initial tension of the brake band 30 need be adjusted for any reason whatsoever, the foot pedal 52 mounted on the base frame side member 11 can be positioned as shown in Fig. 4 and a screw driver fitted in the screw driver slot 47 in the shank 45. The sleeve nut 44 may then be rotated in either direction to bring the terminal 32 either closer to or farther away from the terminal 31, thereby enabling a quick efficient adjustment of the brake band 30.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A brake including a rotatable drum, a brake band partly surrounding said drum having ends movable toward each other for effecting braking action of said band on said drum, a pair of telescopically mounted elements one connected to one end and the other to the other end of said band, and manually operable means active on either of said elements effecting the inward telescoping movement thereof and the movement of one of said ends toward the other.

2. In a device of the character described, a base frame including two parallel side members, a drum rotatably carried by said frame, a brake band partly surrounding said drum having ends between the side members of said frame movable toward each other for effecting braking action of said band on said drum, a brake band operating element for each end of said band telescopically carried by and extending between said side members, and a lever carried by each of said side members individually operable for imparting slidable movement to one or the other of said elements and the movement of the corresponding end of said band toward the other.

3. In a device of the character described, a base frame including two parallel side members, a drum rotatably carried by said frame, a brake band partly surrounding said drum having ends between the side members of said frame movable toward each other for effecting braking action of said band on said drum, a plunger carried by one of said members extending therefrom to one end of said band, means carried by the other of said side members for telescopically receiving said plunger and connected to the other end of said band, and means operable from either of said side members active on either of said plunger or said first means for effecting movement of one of said ends toward the other.

4. In a device of the character described, a base frame including two parallel side members, a drum rotatably carried by said frame, a brake band partly surrounding said drum having ends between the side members of said frame movable toward each other for effecting braking action of said band on said drum, a plunger carried by one of said members extending therefrom to one end of said band, a sleeve carried by the other of said side members telescopically receiving said plunger and connected to the other end of said band, said sleeve and plunger having a stem slidably disposed through their respective side members, and manually operable means active on either of said stems for effecting telescoping movement of said plunger and sleeve to move one of said ends toward the other.

5. In a device of the character described, a base frame including two parallel side members, a drum rotatably carried by said frame, a brake band partly surrounding said drum having ends between the side members of said frame movable toward each other for effecting braking action of said band on said drum, a plunger carried by one of said members extending therefrom to one end of said band, a sleeve carried by the other of said side members telescopically receiving said plunger and connected to the other end of said band, said sleeve and plunger having a stem slidably disposed through their respective side members, and a foot pedal for each of said stems individually operable for effecting telescoping movement of said plunger and sleeve to move one of said ends toward the other.

EARL B. LEAR.